(12) United States Patent
Urban

(10) Patent No.: US 8,724,102 B2
(45) Date of Patent: May 13, 2014

(54) OPTICAL TIME DOMAIN REFLECTOMETRY (OTDR) TRACE ANALYSIS IN PON SYSTEMS

(75) Inventor: Patryk Urban, Vallingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 524 days.

(21) Appl. No.: 12/976,954

(22) Filed: Dec. 22, 2010

(65) Prior Publication Data

US 2012/0163800 A1    Jun. 28, 2012

(51) Int. Cl.
*G01N 21/00* (2006.01)
*H04B 17/00* (2006.01)

(52) U.S. Cl.
USPC .............................. 356/73.1; 398/20; 398/21

(58) Field of Classification Search
None
See application file for complete search history.

(56) References Cited

U.S. PATENT DOCUMENTS

| | | | |
|---|---|---|---|
| 5,491,573 A * | 2/1996 | Shipley | 398/13 |
| 6,396,573 B1 | 5/2002 | Pimpinella | |
| 6,396,575 B1 | 5/2002 | Holland | |
| 6,534,997 B1 | 3/2003 | Horishita et al. | |
| 7,684,702 B2 | 3/2010 | Lu | |
| 7,756,418 B2 * | 7/2010 | Ofalt et al. | 398/25 |
| 8,090,258 B2 * | 1/2012 | DeLew et al. | 398/22 |
| 8,411,259 B2 * | 4/2013 | Levin et al. | 356/73.1 |
| 8,452,173 B2 * | 5/2013 | Hehmann et al. | 398/25 |
| 2006/0029390 A1 | 2/2006 | Schmuck et al. | |
| 2006/0110161 A1 | 5/2006 | Cho et al. | |
| 2008/0031624 A1 * | 2/2008 | Smith et al. | 398/71 |
| 2008/0062408 A1 | 3/2008 | Lai et al. | |
| 2008/0123085 A1 | 5/2008 | Sikora et al. | |
| 2009/0220226 A1 * | 9/2009 | Hehmann et al. | 398/25 |

(Continued)

FOREIGN PATENT DOCUMENTS

| | | |
|---|---|---|
| EP | 0 908 715 A2 | 4/1999 |
| EP | 1 986 351 B1 | 4/2007 |

(Continued)

OTHER PUBLICATIONS

Ehrhardt A., "Monitoring of the Transparent Fibre Infrastructure for FTTx Networks: An Operator's View", *Transparent Optical Networks (ICTON) 2010 12th International Conference*, Jun. 27, 2010-Jul. 1, 2010, pp. 1-5.

(Continued)

*Primary Examiner* — Gordon J Stock, Jr.
(74) *Attorney, Agent, or Firm* — Myers Bigel Sibley & Sajovec, P.A.

(57) ABSTRACT

A client unit and a method are provided performing fault analysis in a Passive Optical Network, PON, by using Optical Time Domain Reflectometry, OTDR. The method comprises triggering a new OTDR measurement, wherein a previous reference measurement has been made indicating an original state of the PON. The method further comprises inserting an OTDR measurement signal into a multistage splitter before a last splitter stage of the multistage splitter, and wherein the last splitter stage is of ratio 2:N; and obtaining at least one new event location based on the OTDR measurement signal. Further, the method comprises calculating a fault magnitude at a given location by subtracting an event magnitude obtained from the new OTDR measurement from the reference OTDR measurement and taking into account the number of drop links connected to the last splitter stage in the reference measurement and the new measurement. Thereby, determination of position and severity of the fault locations is enabled.

20 Claims, 8 Drawing Sheets

(56) References Cited

U.S. PATENT DOCUMENTS

2011/0102776 A1* 5/2011 Hasegawa et al. ......... 356/124.5
2011/0268438 A1* 11/2011 Daems ........................... 398/16
2011/0311218 A1* 12/2011 Nakajima et al. ............... 398/13
2011/0311220 A1* 12/2011 Nakajima et al. ............... 398/20
2012/0002959 A1* 1/2012 Melamed ........................ 398/10
2012/0263458 A1* 10/2012 Wen et al. ...................... 398/28

FOREIGN PATENT DOCUMENTS

| EP | 1 980 834 A1 | 10/2008 |
| EP | 1 986 350 A1 | 10/2008 |
| EP | 2 209 226 A1 | 7/2010 |
| JP | 2011038785 A * | 2/2011 |
| WO | WO 2010/126427 A1 | 11/2010 |
| WO | WO 2013002692 A1 * | 1/2013 |
| WO | WO 2013028108 A1 * | 2/2013 |
| WO | WO 2013028110 A1 * | 2/2013 |
| WO | WO 2013169150 A1 * | 11/2013 |

OTHER PUBLICATIONS

International Search Report Corresponding to International Application PCT/SE2010/051455; Date of Mailing: Oct. 5, 2011; 13 pages.
International Preliminary Report on Patentability Corresponding to International Application No. PCT/SE2010/051455; Date of Mailing: Apr. 2, 2013; 6 Pages.
Lee et al., "A Remotely Reconfigurable Remote Node for Next-Generation Access Networks," IEEE Photonics Technology Letters, vol. 20, No. 11, Jun. 1, 2008, pp. 915-917.

* cited by examiner $$\begin{array}{|c|c|c|c|} \hline \alpha_{1,1} & \alpha_{1,2} & \ldots & \alpha_{1,J} \\ \hline \alpha_{2,1} & \alpha_{2,2} & \ldots & \alpha_{2,J} \\ \hline \alpha_{3,1} & \alpha_{3,2} & \ldots & \alpha_{3,J} \\ \hline \ldots & \ldots & \ldots & \ldots \\ \hline \alpha_{N,1} & \alpha_{N,2} & \ldots & \alpha_{N,J} \\ \hline \end{array}$$

| 0,50 | 1,00 | 1,00 | 1,00 |
|------|------|------|------|
| 1,00 | 1,00 | 1,00 | 1,00 |
| 1,00 | 1,00 | 1,00 | 1,00 |
| 1,00 | 1,00 | 1,00 | 1,00 |

OPTICAL TIME DOMAIN REFLECTOMETRY (OTDR) TRACE ANALYSIS IN PON SYSTEMS

TECHNICAL FIELD

The invention relates generally to a client unit and a method for performing fault analysis in a Passive Optical network, PON. The present invention relates in particular to a client unit and a method for performing fault analysis in a PON using OTDR for enabling determination of position and severity of fault locations.

BACKGROUND

A Passive Optical Network, PON, is a point-to-multipoint network architecture employing fibre cables from a central office to premises. It employs unpowered optical splitters to enable a single optical fibre to serve multiple premises. A PON comprises an Optical Line Terminal, OLT, at the central office of the service provider. It comprises a number of Optical Network Terminals, ONTs, near end users. A PON configuration reduces the amount of fiber and central office equipment required compared with point-to-point architectures. A passive optical network is a form of fiber-optic access network.

In order to supervise and monitor the performance of a PON, Optical Time-Domain Reflectometry, OTDR, is used. An OTDR device injects a series of optical pulses into the fiber. The series of optical pulses, also called OTDR signal travel down the network towards the ONTs. Parts of the OTDR signals are reflected back towards the OTDR device. The back reflected, or backscattered, OTDR signal may be used for estimating the fiber's length and overall attenuation, including splitter losses. The backscattered OTDR signal may also be used to locate faults, such as breaks, and to measure optical return loss.

However, the amount of light scattered back to the OTDR for measurement is quite small, about one-millionth of the optical power in the test pulse. Since so little of the light comes back to the OTDR for analysis, the OTDR receiver circuit must be very sensitive. That means that big reflections, which may be one percent of the outgoing signal, will saturate the receiver, or overload it.

Another difficulty with OTDR measurements is that backscattered light from the fibers between the splitter and the ONTs will be summarized passing back through the splitter and again attenuated, making it very difficult to obtain the magnitude of a possible fault in one or more fibres between the splitter and the ONTs.

As a consequence, misinterpretations may arise when reading or analyzing the backscattered OTDR signal, also referred to as the trace, after the splitter. Even if a fault is detected after the splitter, i.e. between the splitter and the ONTs, it is impossible to define which drop-branch, i.e. which fiber between the splitter and the ONTs, is affected as the received backscattered signal is a superposition of power coming back from all of the drop links.

SUMMARY

It is an object of the exemplifying embodiments of the present invention to address at least some of the problems outlined above. In particular, it is an object of the exemplifying embodiments of the present invention to provide monitoring and OTDR trace analysis in PON systems. These objects and others may be obtained by providing a method and a client unit according to the independent claims attached below.

According to an aspect, a method is provided for performing fault analysis in a Passive Optical Network, PON, by using Optical Time Domain Reflectometry, OTDR. The method comprises triggering a new OTDR measurement, wherein a previous reference measurement has been made indicating an original state of the PON. The method further comprises inserting an OTDR measurement signal into a multistage splitter before a last splitter stage of the multistage splitter, and wherein the last splitter stage is of ratio 2:N; and obtaining at least one new event location based on the OTDR measurement signal. Further, the method comprises calculating a fault magnitude at a given location by subtracting an event magnitude obtained from the new OTDR measurement from the reference OTDR measurement and taking into account the number of drop links connected to the last splitter stage in the reference measurement and the new measurement. Thereby, determination of position and severity of the fault locations is enabled.

According to an embodiment, the insertion of an OTDR measurement signal is triggered by the reception of a fault alarm or an Optical Transceiver Monitoring, OTM, measurement report from at least one Optical Network Terminal, ONT, connected to the PON.

According to an embodiment, a total loss, TLref, in the reference OTDR measurement is represented by $$TLref = 5*\log\left(\frac{N^2}{\sum_{n=1}^{N}\prod_{j=1}^{J}\alpha REF_{n,j}^2 - M_{REF}}\right),$$

where N is the number of branches of the last splitter stage of the multistage splitter, J is the number of events and M is the number of non-connected branches of the last splitter stage of the multistage splitter.

According to yet an embodiment, wherein a total loss, TLnew, in the new OTDR measurement is represented by $$TLnew = 5*\log\left(\frac{N^2}{\sum_{n=1}^{N}\prod_{j=1}^{J}\alpha NEW_{n,j}^2 - M_{NEW}}\right),$$

where N is the number of branches of the last splitter stage of the multistage splitter, J is the number of events and M is the number of non-connected branches of the last splitter stage of the multistage splitter.

According to an embodiment, the difference, ΔTL, between the total loss in the reference OTDR measurement and the total loss in the new OTDR measurement is represented by $$\Delta TL = \left|5*\log\left(\frac{\sum_{n=1}^{N}\prod_{j=1}^{J}\alpha NEW_{n,j}^2 - M_{NEW}}{\sum_{n=1}^{N}\prod_{j=1}^{J}\alpha REF_{n,j}^2 - M_{REF}}\right)\right|.$$

According to an aspect, a client unit in a fibre plant manager adapted to perform fault analysis in a Passive Optical Network, PON, by using Optical Time Domain Reflectometry, OTDR, is provided. The client unit comprises and interface unit and a processing unit. The processing unit is adapted to trigger a new OTDR measurement, wherein a previous reference measurement has been made indicating an original state of the PON. The processing unit is further adapted to insert an OTDR measurement signal into a multistage splitter before a last splitter stage of the multistage splitter, and wherein the last splitter stage is of ratio 2:N, via the interface unit; and to obtain at least one new event location based on the OTDR measurement signal, via the interface unit. The processing unit is further adapted to calculate a fault magnitude at a given location by subtracting an event magnitude obtained from the new OTDR measurement from the reference OTDR measurement and taking into account the number of drop links connected to the last splitter stage in the reference and the new measurement. Thereby, determination of position and severity of the fault locations is enabled.

According to an embodiment, the interface unit is further adapted to receive a fault alarm or an Optical Transceiver Monitoring, OTM, measurement report from at least one Optical Network Terminal, ONT, connected to the PON, wherein the processing unit is triggered to insert the OTDR measurement signal into the multistage splitter before the last splitter stage of the multistage splitter.

According to an embodiment, the processing unit is adapted to represent a total loss, TLref, in the reference OTDR measurement by $$TLref = 5*\log\left(\frac{N^2}{\sum_{n=1}^{N}\prod_{j=1}^{J}\alpha REF_{n,j}^2 - M_{REF}}\right),$$

where N is the number of branches of the last splitter stage of the multistage splitter, J is the number of events and M is the number of non-connected branches of the last splitter stage of the multistage splitter.

According to yet an embodiment, the processing unit is adapted to represent a total loss, TLnew, in the new OTDR measurement by $$TLnew = 5*\log\left(\frac{N^2}{\sum_{n=1}^{N}\prod_{j=1}^{J}\alpha NEW_{n,j}^2 - M_{NEW}}\right),$$

where N is the number of branches of the last splitter stage of the multistage splitter, J is the number of events and M is the number of non-connected branches of the last splitter stage of the multistage splitter.

According to yet an embodiment, the processing unit is adapted to represent the difference, $\Delta TL$, between the total loss in the reference OTDR measurement and the total loss in the new OTDR measurement, $\Delta TL$, by $$\Delta TL = \left|5*\log\left(\frac{\sum_{n=1}^{N}\prod_{j=1}^{J}\alpha NEW_{n,j}^2 - M_{NEW}}{\sum_{n=1}^{N}\prod_{j=1}^{J}\alpha REF_{n,j}^2 - M_{REF}}\right)\right|.$$

The method and the client unit have the advantage that the position and severity of the fault locations can be determined. By being able to determine the severity and position of a possible fault or faults, it can be determined if actions need to be taken and in such a case, where the fault or faults are located requiring attention. Also, it can be determined if no action needs to be taken, thereby avoiding sending maintenance and repair personnel to the location of the fault. The method and the client unit provide high accuracy and fault detection sensitivity. Another advantage is that the method and client unit provides a cost efficient solution as a plurality of OLTs may be served by a single supervision or monitoring system, such as e.g. a Fibre Plant Manager.

BRIEF DESCRIPTION OF DRAWINGS

The invention will now be described in more detail by means of exemplary embodiments and with reference to the accompanying drawings, in which.

DETAILED DESCRIPTION

Briefly described, a method and a client unit are provided for monitoring and supervising a passive optical network. The monitoring and supervising of the PON comprises analyzing a new detected event in at least one of the fibres between the splitter and the ONTs, also called the drop links.

Figure 1:
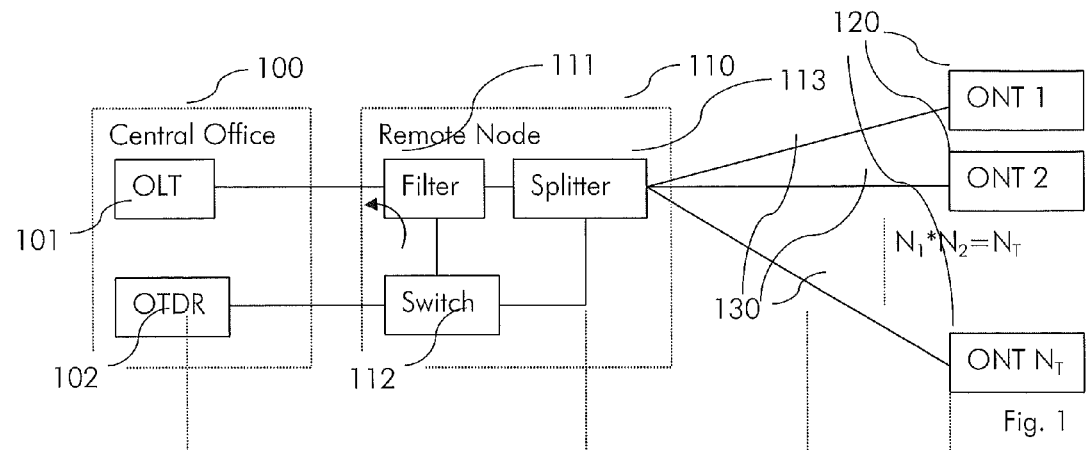
FIG. 1 is a schematic illustration of a PON.

FIG. 1 is a schematic illustration of a PON. FIG. 1 illustrates the Passive Optical Network, PON, comprising a central office 100 having an Optical Line Termination, OLT, 101 and an OTDR device 102. The PON also comprises a remote node 110 having a filter 111, a switch 112 and a splitter 113. The OLT 101 is connected to the splitter 113 via the filter 111. The OTDR device 102 is connected to the switch 112, which in turn is adapted to insert an OTDR signal from the OTDR device 102 into the splitter 113. The splitter 113 is in an exemplifying embodiment a multistage splitter. In the embodiment illustrated in FIG. 1, the splitter is a two stage splitter comprising a first splitter stage of 1:$N_1$ and a second splitter stage of 2:$N_2$ thereby having a total number of branches, $N_T$, which is $N_1*N_2$. In FIG. 1, the number of ONTs 120 is $N_1*N_2$. The fibres from the splitter 113 to the respective ONTs 120 are called drop links 130. In FIG. 1, all branches of the splitter 113 are connected to drop links 130. It shall be noted that it is not compulsory to connect drop links to all branches.

Further, the OTDR device 102 is connected to the switch 112, which is adapted to insert the OTDR signal between the first and the second splitter stage of the splitter 113. By inserting the OTDR signal after the first splitter stage and before the second splitter stage, the attenuation due to the splitter 113 can be reduced, since each splitter stage is associated with a certain attenuation or loss.

OTDR monitoring and supervision is often combined with Optical Transceiver Monitoring, OTM, providing measurable parameters, such as transmit/receive power at the OLT and the ONTs. The parameters are collected from the ONTs by a centralized control unit (not shown), which also controls the OTDR device and the optical switch.

Combined OTDR and OTM techniques enable measurement of various performance related parameters, such as transmit and receive optical power levels, discrete and cumulative losses as well as reflectance. Analysis of those parameters gives a complete picture of any the possible failures that may occur between the OLT and the ONTs.

Figure 2:
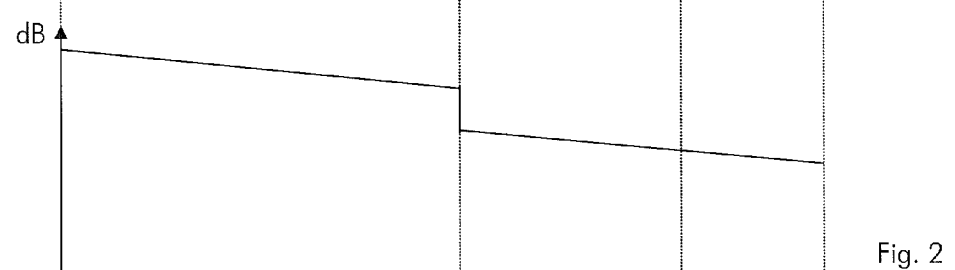
FIG. 2 is a simplified illustration of an exemplifying OTDR measurement of the PON in FIG. 1 when no events are detected.

FIG. 2 is a simplified illustration of an exemplifying OTDR measurement in the PON of FIG. 1 when no events are detected.

Hereinafter, an event is what is detected by the OTDR measurement and a fault is what is calculated from the event.

FIG. 2 should be looked at together with FIG. 1. FIG. 2 illustrates the attenuation along the PON from the OTDR device 102. It shall be pointed out the FIG. 2 is a simplified illustration and any possible attenuation due to the switch 112 is not shown. FIG. 2 illustrates that the OTDR signal is constantly attenuated until it reaches the splitter 113. The splitter 113 is associated with a certain instant attenuation which is illustrated in FIG. 2 as a steep drop as the OTDR signal enters into the splitter. Then the OTDR signal is again constantly attenuated as it is travelling along the drop links towards the ONTs 120.

Figure 3:
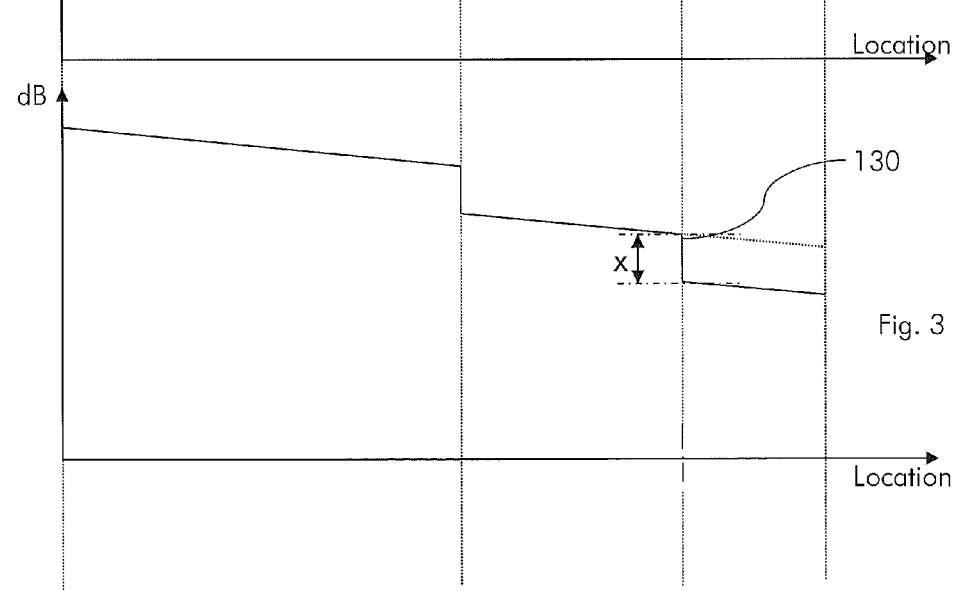
FIG. 3 is a simplified illustration of an exemplifying OTDR measurement of the PON in FIG. 1 when an event is detected by the OTDR measurement.

FIG. 3 is a simplified illustration of an exemplifying OTDR measurement when an event is detected by the OTDR measurement. It shall be pointed out the FIG. 3 is a simplified illustration and any possible attenuation due to the switch 112 is not shown, just as FIG. 2.

FIG. 3 should be looked at together with FIGS. 1 and 2. In this example, FIG. 2 can be said to illustrate a reference measurement.

FIG. 3 illustrates the OTDR signal travelling from the OTDR device 102 and the OTDR signal is attenuated as it passes the multistage splitter 113. FIG. 3 illustrates that at a certain location, j, the OTDR signal suffers an additional attenuation 130. This additional attenuation 130 is due to an event in a drop link and is illustrated as a steep drop. It is illustrated in FIG. 3 to have a magnitude of x dB, wherein x is the magnitude as seen by the OTDR device when the backscattered signal has passed through the splitter 113 and suffered additional instant attenuation. Therefore, it is not the actual attenuation caused by the event at location j.

By the result from the OTDR measurement illustrated in FIG. 3, it is possible to detect the event at location j, but it is very difficult, if not impossible, to ascertain the severity of the event and to decide whether it is necessary to actually take actions to repair the fibre drop link or take any other actions such as removing the fibre drop link. The higher the magnitude of the actual fault detected by the event, the greater the severity of the event at location j.

Below a method and a client unit for performing fault analysis in a PON using OTDR and a client unit will be described with reference to FIGS. 4 and 5 respectively. It shall be noted that the total number of branches of the multistage splitter is denoted by N in the following, which corresponds to $N_2$ of FIG. 1.

Figure 4:
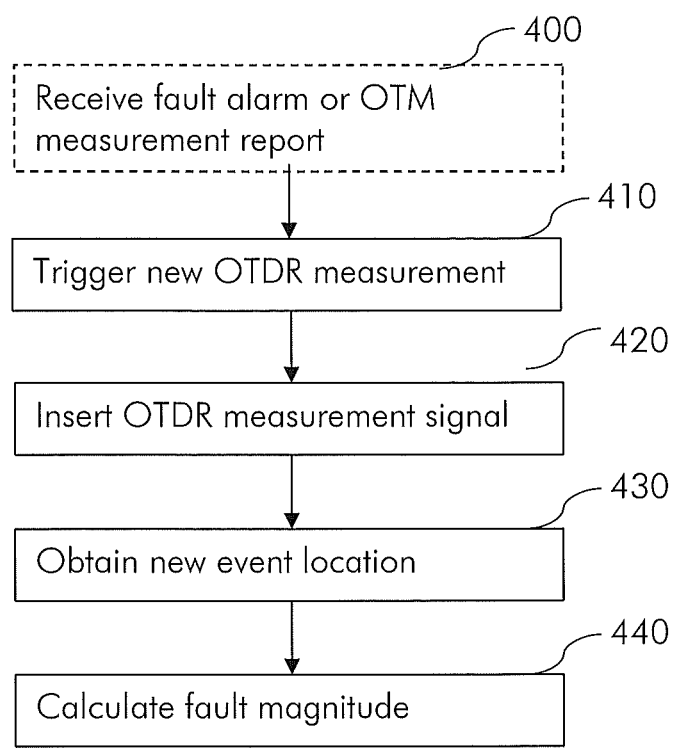
FIG. 4 is a flowchart of an exemplifying method for performing fault analysis in a PON using OTDR.

FIG. 4 is a flowchart of an exemplifying method for performing fault analysis in a PON using OTDR.

FIG. 4 illustrates the method comprising triggering 410 a new OTDR measurement and inserting 420 an OTDR measurement signal into a multistage splitter before a last splitter stage of the multistage splitter. The last splitter stage is of ratio 2:N. By inserting the OTDR measurement signal before the last splitter stage of the multistage splitter, the attenuation due to the signal going through the splitter can be reduced. The OTDR measurement signal then travels down the fibre drop links towards the ONTs.

FIG. 4 further illustrates the method comprising obtaining 430 at least one new event location based on the OTDR measurement signal. As the OTDR measurement signal travels down the fibre drop links, it will be subjected to an instant attenuation as illustrated in FIG. 2. In case of any fault in any of the fibre drop link, a corresponding event will be detected in the backscattered signal, as illustrated in FIG. 3. Again with reference to FIG. 4, the method further comprises calculating 440 a fault magnitude at a given location by subtracting an event magnitude obtained from the new OTDR measurement from a reference measurement and taking into account the number of drop links connected to the last splitter stage in reference measurement and the current or new measurement. The event magnitude is the magnitude that is indicated in the OTDR measurement and the fault magnitude is the actual magnitude of the fault that has occurred in at least one fibre drop link.

This has the advantage that the position and severity of the fault locations can be determined. By being able to determine the severity and position of a possible fault or faults, it can be determined if actions need to be taken and in such a case, where the fault or faults are located requiring attention. Also, it can be determined if no action needs to be taken, thereby avoiding sending maintenance and repair personnel to the location of the fault.

According to an embodiment, the insertion of an OTDR measurement signal is triggered by receiving 400 a fault alarm or an OTM measurement report from at least one ONT connected to the PON.

In an example, the method further comprises querying the ONTs being connected to the PON about their received optical power periodically.

In this example, by periodically querying the ONTs being connected to the PON about their received optical power, any change in their received optical power is quickly detected. This enables swift detection of any sudden decrease in received optical power.

The querying comprises sending an information request regarding the received optical power at the ONTs.

In another example, the method further comprises querying the ONTs being connected to the PON about their received optical power in demand.

In this example, resources can be saved by only querying the ONTs on demand. On-demand may be triggered manually or automatically as soon as an alarm is received from an ONT, the alarm indicating low received optical power.

According to an embodiment, a total loss, TLref, in the reference OTDR measurement is represented by:

$$TLref = 5*\log\left(\frac{N^2}{\sum_{n=1}^{N}\prod_{j=1}^{J}\alpha REF_{n,j}^2 - M_{REF}}\right),$$

where N is the number of branches of the last splitter stage of the multistage splitter, J is the number of events and M is the number of non-connected branches of the last splitter stage of the multistage splitter.

As mentioned above, in relation to FIG. 1, it is not compulsory to connect drop links to all branches. In other words, the multistage splitter may be able to support more ONTs than currently being connected thereto. However, the number of non-connected branches will affect the total loss. This will be explained in more detail below.

According to an embodiment, a total loss, TLnew, in the new OTDR measurement is represented by:

$$TLnew = 5*\log\left(\frac{N^2}{\sum_{n=1}^{N}\prod_{j=1}^{J}\alpha NEW_{n,j}^2 - M_{NEW}}\right),$$

where N is the number of branches of the last splitter stage of the multistage splitter, J is the number of events and M is the number of non-connected branches of the last splitter stage of the multistage splitter.

Again, it is not compulsory to connect drop links to all branches. However, the number of non-connected branches will affect the total loss. It can also be seen from the above equations, that the number of non-connected branches in the new OTDR measurement need not be the same as the number of non-connected branches in the reference measurement.

According to yet an embodiment, the difference, ΔTL, between the total loss in the reference OTDR measurement and the total loss in the new OTDR measurement is represented by:

$$\Delta TL = \left|5*\log\left(\frac{\sum_{n=1}^{N}\prod_{j=1}^{J}\alpha NEW_{n,j}^2 - M_{NEW}}{\sum_{n=1}^{N}\prod_{j=1}^{J}\alpha REF_{n,j}^2 - M_{REF}}\right)\right|.$$

From the equation above, it can be seen that the number of non-connected branches in the two OTDR measurements are taken into account when representing the difference in the total loss.

Different scenarios may arise, wherein a drop link may be subjected to more than one event and also more than one drop link may be associated with or subjected to one or more events. Some scenarios are more likely than others to occur, but they may still happen.

According to yet an embodiment, an alarm or measurement report is received from one ONT and the number of new event locations is one and no events were detected in the reference measurement, wherein all the branches were connected to the splitter in the OTDR reference measurement and are also connected in the new OTDR measurement. In this embodiment, the method further comprises calculating the magnitude, α, of a fault using:

$$\alpha[dB] = 5*\log\left(1 - N + N*10^{\frac{-|\Delta TL|}{5}}\right).$$

It shall be noted that the magnitude, α, of the fault is the actual magnitude as opposed to the magnitude x of FIG. 1, which is the magnitude of the event "seen" by the OTDR device as the backscattered light has passed the multistage splitter. Again for clarity, an event is what is detected by the OTDR and a fault is what is calculated from the event.

According to an embodiment, wherein an alarm or measurement report is received from one ONT and the number of new event locations is j, j>1, and no events were detected in the reference measurement, the method further comprises calculating the magnitude of the fault in the first ONT, α, using:

$$\alpha_j[dB] = 5*\log(1 - N + N*10^{-|\Delta TL_j|}).$$

In this scenario, a fibre drop link is subjected to more than one fault. Merely as an example, assume the drop link is subjected to two faults. Then, the ONT will experience an attenuation due to both faults which is the multiplication of the two faults. Assume the first fault induces an attenuation of $\alpha_1$ (in linear scale) and the second fault induces an attenuation of $\alpha_2$ (in linear scale). Then the ONT will experience a total attenuation of $\alpha_1*\alpha_2$ (in linear scale). The ONT will not have any "knowledge" of the number of faults in the drop link. The number of event locations will be derivable from the backscattered OTDR measurement signal. This will be explained in more detail below.

According to yet another embodiment, wherein an alarm or measurement report is received from n number of ONTs, n>1, and the number of new event locations is one and no events were detected in the reference measurement, the method further comprises calculating the magnitude of the fault in the first ONT, α, using:

$$\alpha[dB] = 5*\log\left(N \times 10^{\frac{-|\Delta TL|}{5}} - \sum_{m=2}^{N}\alpha_n^2\right).$$

In this scenario, more than one ONT experiences reduced signal power and issues an alarm. Also in this scenario, it is assumed that there is only one event in each of the drop links experiencing an unexpected or new attenuation.

Figure 5:
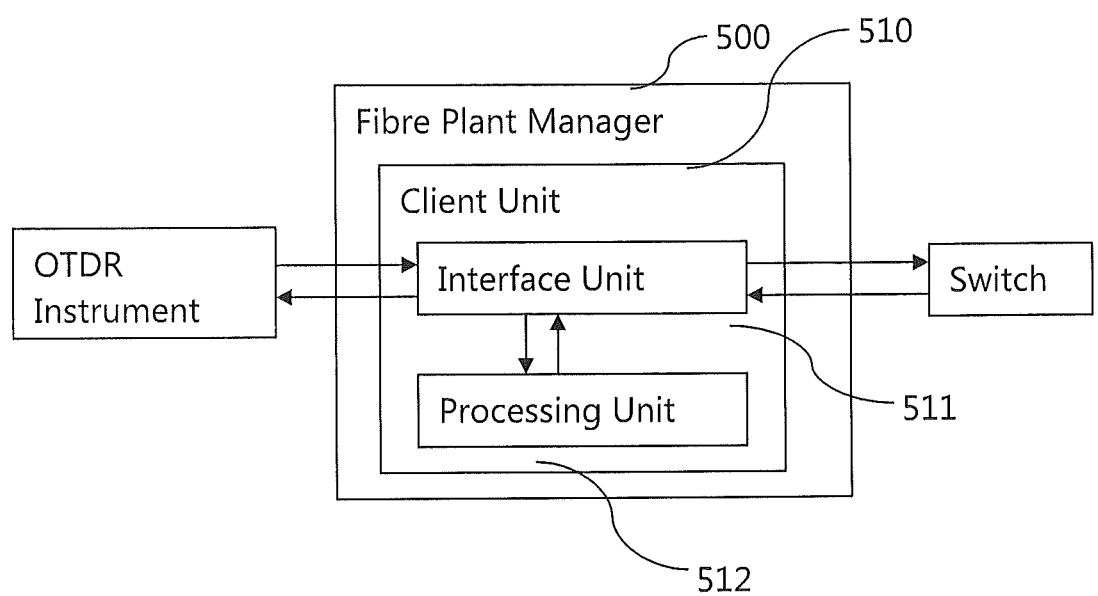
FIG. 5 is a block diagram of an exemplifying embodiment of a client unit in a Fibre Plant Manager, FPM.

FIG. 5, which is a block diagram of an exemplifying client unit 510 in a Fibre Plant Manager, FPM, 500 adapted to perform fault analysis in a PON by using OTDR. The client unit has the same objects and advantages as the method just described above and will only be discussed in brief, for simplicity reasons.

FIG. 5 illustrates the client unit 510 comprising an interface unit 511 and a processing unit 512. The processing unit 512 is adapted to trigger a new OTDR measurement, wherein a previous reference measurement has been made indicating an original state of the PON. The processing unit 512 is further adapted to insert an OTDR measurement signal into a multistage splitter (not shown) before a last splitter stage of the multistage splitter, via the interface unit 511. The last splitter stage is of ratio 2:n. The processing unit 512 is further adapted to obtain at least one new event location based on the OTDR measurement signal, via the interface unit 511. The processing unit 512 is further adapted to calculate a fault magnitude at a given location by subtracting an event magnitude obtained from the new OTDR measurement from said reference OTDR measurement and taking into account the number of drop links connected at the last splitter stage in the reference measurement and the new measurement.

Thereby determination of position and severity of the fault locations is enabled.

According to an embodiment, the interface unit 511 is adapted to receive a fault alarm or an Optical Transceiver Monitoring, OTM, measurement report from at least one Optical Network Terminal, ONT, connected to the PON, wherein the processing unit is triggered to insert the OTDR measurement signal into the multistage splitter before the last splitter stage of the multistage splitter.

In an embodiment, the processing unit 512 is further adapted to periodically query the ONTs being connected to the PON about their received optical power.

In another embodiment, the processing unit 511 is further adapted to query the ONTs being connected to the PON about their received optical power on-demand.

According to yet an embodiment, the processing unit 512 is adapted to represent a total loss, TLref, in the reference OTDR measurement by:

$$TLref = 5 * \log\left(\frac{N^2}{\sum_{n=1}^{N}\prod_{j=1}^{J} \alpha REF_{n,j}^2 - M_{REF}}\right),$$

where N is the number of branches of the last splitter stage of the multistage splitter, J is the number of events and M is the number of non-connected branches of the last splitter stage of the multistage splitter.

In still an embodiment, the processing unit 512 is adapted to represent a total loss, TLnew, in the new OTDR measurement by:

$$TLnew = 5 * \log\left(\frac{N^2}{\sum_{n=1}^{N}\prod_{j=1}^{J} \alpha NEW_{n,j}^2 - M_{NEW}}\right),$$

where N is the number of branches of the last splitter stage of the multistage splitter, J is the number of events and M is the number of non-connected branches of the last splitter stage of the multistage splitter.

According to an embodiment, the processing unit 512 is adapted to represent the difference, $\Delta TL$, between the total loss in the reference OTDR measurement and the total loss in the new OTDR measurement, $\Delta TL$, by:

$$\Delta TL = \left|5 * \log\left(\frac{\sum_{n=1}^{N}\prod_{j=1}^{J} \alpha NEW_{n,j}^2 - M_{NEW}}{\sum_{n=1}^{N}\prod_{j=1}^{J} \alpha REF_{n,j}^2 - M_{REF}}\right)\right|.$$

According to yet an embodiment, the alarm is received from one ONT and the number of new event locations is one and no events were detected in the reference measurement. Further all the branches were connected to the splitter in the OTDR reference measurement and are connected in the new OTDR measurement. The processing unit 512 is adapted to calculate the magnitude of the fault, $\alpha$, using:

$$\alpha[dB] = 5*\log\left(1 - N + N*10^{\frac{-|\Delta TL|}{5}}\right).$$

In an example, the alarm is received from one ONT and the number of new event locations is j, j>1, and no events were detected in the reference measurement. The processing unit 512 is adapted to calculate the magnitude of the fault in the first ONT, $\alpha$, using:

$$\alpha_j[dB] = 5*\log(1-N+N*10^{-|\Delta TL_j|}).$$

In still an example, the alarm is received from n number of ONTs, n>1, and the number of new event locations is one and no events were detected in the reference measurement. The processing unit 512 is adapted to calculate the magnitude of the fault in the first ONT, $\alpha$, using:

$$\alpha[dB] = 5*\log\left(N*10^{\frac{-|\Delta TL|}{5}} - \sum_{m=2}^{N} \alpha_n^2\right).$$

It should be noted that FIG. 5 merely illustrates various functional units in the client unit in a Fibre Plant Manager in a logical sense. The functions in practice may be implemented using any suitable software and hardware means/circuits etc. Thus, the invention is generally not limited to the shown structures of the client unit and the functional units. Hence, the previously described exemplary embodiments may be realised in many ways. For example, one embodiment of the present invention includes a computer-readable medium having instructions stored thereon that are executable by the client unit for executing the method. The instructions executable by the computing system and stored on the computer-readable medium perform the method steps of the present invention as set forth in the claims.

Figure 6:
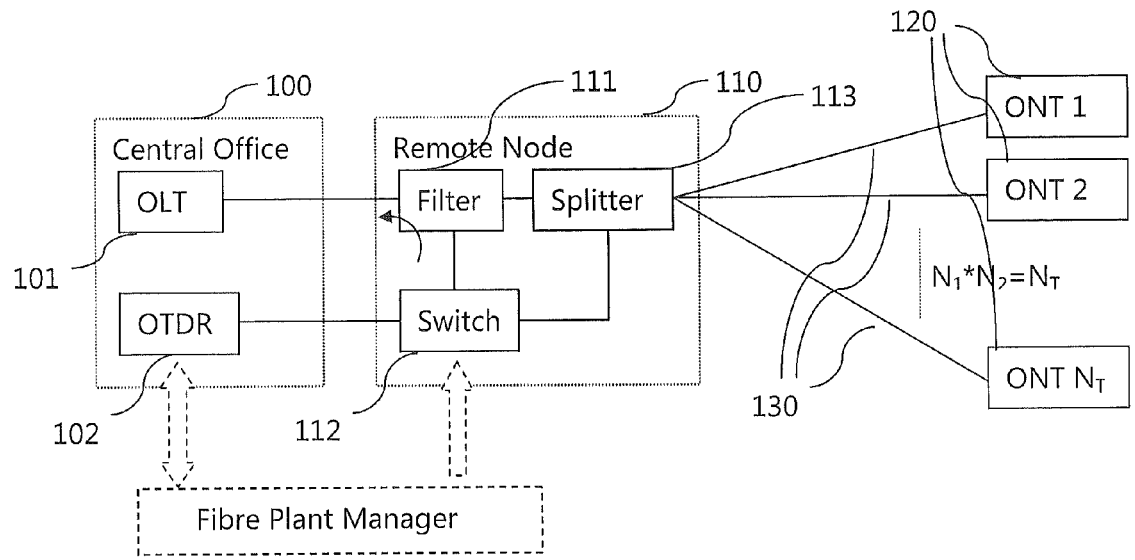
FIG. 6 is a schematic illustration of a PON and a Fibre Plant Manager.

FIG. 6 is a schematic illustration of a PON and a Fibre Plant Manager. The PON of FIG. 6 corresponds to the PON of FIG. 1. Hence the same numerals are used to represent the different entities of the PON. FIG. 6 illustrates an exemplifying Fibre Plant Manager in relation to the PON.

The OTDR signal is in an example employed in the 1625-1675 nm band. As was described above, in relation to FIG. 1, the OTDR device 102 is typically located at the central office of a service provider. The OTDR device sends an OTDR measurement signal via a switch, e.g. an optical switch, through the last splitter stage of the multistage splitter 113 towards the ONTs 120. The OTDR signal is backscattered towards the OTDR device 102. The backscattered OTDR signal travels through the splitter on its way to the OTDR device. Hence, the OTDR device 102 "sees" the summation of backscattered signals from all drop links and also the magnitude of any event in a drop link is "falsified", meaning it is not the actual magnitude of the fault giving rise to the event.

Figure 7:
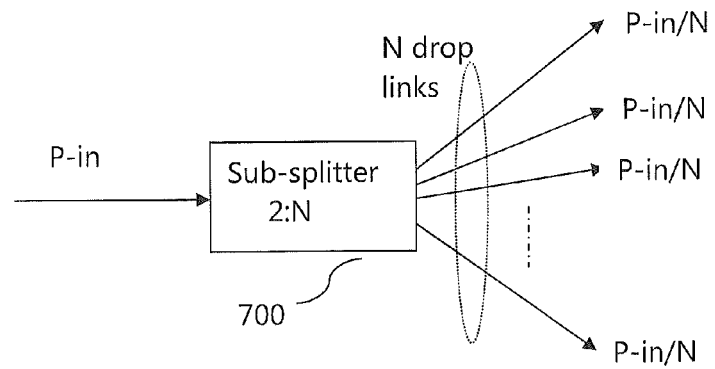
FIG. 7 is a schematic illustration of the last splitter stage of a multistage splitter.

FIG. 7 is a schematic illustration of the last splitter stage 700 of a multistage splitter. FIG. 7 illustrates a signal being inserted into the last splitter stage 700 having a power of P-in. The outgoing signals from the last splitter stage all have a power of P-in/N. This is valid both if the incoming signal is a data signal and if the incoming/inserted signal is an OTDR measurement signal. It is assumed here that the splitter divides its incoming signal uniformly to the outgoing signals.

The last splitter stage is of ratio 2:N, wherein a first input comes from the previous splitter stage and a second input is a monitoring port. Merely as an example, a multistage splitter has two splitter stages, wherein the first splitter stage is 1:4 and the second splitter stage is 2:8. This results in the splitter having a total ratio of 1:32, wherein the second splitter stage has four monitoring ports.

In case the incoming signal is an OTDR measurement signal, it is inserted into the monitoring port of the last splitter stage. The input OTDR signal propagates from the monitor input port through the splitter and reaches the splitter output port. Further on, the signals propagate along the fiber drop links. Part of each signal is backscattered due to Rayleigh Backscattering phenomena. The power level of the returned signal is proportional to the initial power at the splitter output port P-in/N. The proportionality is driven by the fiber attenuation per km and backscattering coefficient. Next, the signals returned from all splitter output ports travel through the splitter again and a superposition of all of them is sent to the monitor port which now acts as a monitor output port. The total output power at the monitor port is given as $$N * \frac{P-\text{in}}{N^2}.$$

Thus, the loss in the splitter detected by the OTDR, is calculated as follows $$5 * \log\left(\frac{P-\text{in}}{N * \frac{P-\text{in}}{N^2}}\right) = 5 * \log(N).$$

As can be seen, the OTDR measurement takes into account the double loss that the signal experiences as the signal travels up and down the drop link, through the splitter. Due to this fact, the factor in front of the logarithm is "5" instead of "10".

If all the splitter output ports, also referred to as branches above, are connected to drop links, the OTDR will "see" half of the real loss of the splitter, e.g. an ideal 1:8 splitter would appear as 4.5 dB loss instead of 9 dB on the OTDR trace or the backscattered OTDR signal. However, the fewer fiber drop links connected to the splitter output ports, the lower the power backscattered to the OTDR. This means that the measured splitter loss differs in function of the number of connected fiber spans. If M out of N branches are non-connected, the OTDR-recorded loss in the splitter is $$L_{splitter} = 5 * \log\left(\frac{N^2}{N-M}\right). \quad (1)$$

The loss in the splitter increases as M increases. In case only one drop link is connected to the splitter output port, then M=N−1. Then the measured splitter loss is $$5 * \log\left(\frac{N^2}{1}\right) = 10 * \log(N),$$

which represents the real loss of the splitter.

Based on the above approach, a generic equation to retrieve magnitudes of new events (faults) occurring after the splitter can be formulated.

Figures 8, 9:
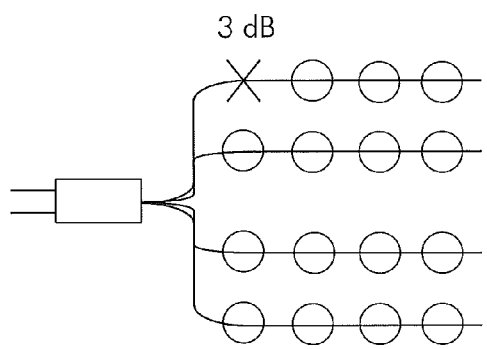
FIG. 8 is an exemplifying event matrix illustrating a scenario with J event locations in each out of N fibre drop links.
FIG. 9 is an illustration of an event/fault scenario in which one event/fault occurs in one fibre drop link.

Assuming J potential event locations in each drop link out of N fibre drop links in a given sub-splitter, a matrix of events can be composed, where $\alpha_{n,j}$ is a linear factor describing the loss which the signal experiences in n-th fibre and at j-th location, corresponding to the distance on the fibre drop link. This is also illustrated in FIG. 8.

Some example event scenarios and corresponding event matrices are given in FIGS. 9-12, where a cross represents the actual fibre fault at a given distance, and a circle represents a no-fault (needed to maintain a given size of matrix).

Each row of the event matrix corresponds to a single fibre drop link. The total loss seen by the ONT or receiver at the end of a given link, n, is $$\alpha_{n,1} * \alpha_{n,2} * \ldots * \alpha_{n,j} = \prod_{j=1}^{J} \alpha_{n,j}.$$

As described above, the ONT will only "see" or experience the total loss in the fibre drop link. The ONT cannot determine the magnitude and distance of each event on the fibre drop link, in relation to splitter and the ONT, of each event. This is referred to as horizontal overlap.

Each column of the event matrix in FIG. 8 corresponds to a single location as indicated on the OTDR trace. The total loss as "seen" by the OTDR for a given event location, j, in the trace is $$\alpha_{1,j} + \alpha_{2,j} + \ldots + \alpha_{N,j} = \sum_{n=1}^{N} \alpha_{n,j}.$$

Since the OTDR will only "see" the total step for all events placed at the same distance on each branch, it cannot determine the magnitude and branch for each separate event. This is referred to as vertical overlap of events.

Using the same approach as in (1), a generic formulation can be obtained for the total loss, TL, caused by a splitter and all events in case of M branches non-connected to the splitter.

$$TL = 5 * \log\left(\frac{N^2}{\sum_{n=1}^{N} \prod_{j=1}^{J} \alpha_{n,j}^2 - M}\right). \quad (2)$$

As described above, the difference in total loss between the reference OTDR measurement and the new OTDR measurement, ΔTL, can be expressed as ΔTL=|TLref−TLnew|, where TLref is the loss in the reference OTDR measurement. The TLnew is the total loss in the new OTDR measurement and it may include possible additions or disconnections at the splitter output ports. In order to take the number of non-connected splitter output ports into consideration, the difference in total loss between the reference OTDR measurement and the new OTDR measurement, ΔTL, is defined as:

$$\Delta TL = \left|5 * \log\left(\frac{\sum_{n=1}^{N} \prod_{j=1}^{J} \alpha NEW_{n,j}^2 - M_{NEW}}{\sum_{n=1}^{N} \prod_{j=1}^{J} \alpha REF_{n,j}^2 - M_{REF}}\right)\right|. \quad (3)$$

In this equation, Mref is the amount of non-connected drop links in the reference OTDR measurement and Mnew is the amount of non-connected drop links in the new OTDR measurement.

Different event and/or fault scenarios will now be described with reference to FIGS. 9-12. Reference is also made to FIG. 13 illustrating an exemplifying OTDR trace reference and a new OTDR trace.

FIG. 9 is an illustration of an event/fault scenario in which one event/fault occurs in one fibre drop link.

As was stated above, different scenarios are more or less probable to occur. The scenario illustrated in FIG. 9 wherein a single event in a single drop link occurs has a relatively very high probability of occurring, meaning this scenario is the most probable of all scenarios.

In this scenario, equation 3 above is reduced to:

$$\Delta TL = \left|5 * \log\left(\frac{N - 1 + \alpha_{NEW}^2}{N}\right)\right|. \quad (4)$$

From this equation, the actual magnitude, $\alpha_{NEW}$, of the fault giving rise to the event can then be calculated using:

$$\alpha_{NEW}[dB] = 5*log\left(1 - N + N*10^{\frac{-|\Delta TL|}{5}}\right). \quad (5)$$

For simplicity of the above and in the following analysis, it is assumed that in the OTDR reference measurement no events were recorded and all branches were connected and are connected in the new OTDR measurement. This means that Mref=Mnew=0. The magnitude, $\alpha_{NEW}$ [dB], of the fault should correspond to a power difference detected by or experienced by an ONT which is connected to fibre drop link subjected to the fault. Such a difference, also denoted $\Delta$OTM (Optical Transceiver Monitoring), has to satisfy the following condition:

$$\Delta OTM = \alpha_{NEW}[dB] \pm \delta_{OTM},$$

$$\Delta OTM = 5*\log\left(1 - N + N*10^{\frac{-|\Delta TL|}{5}}\right) \pm \delta_{OTM}, \quad (7)$$

where $\delta_{OTM}$ is the accuracy of OTM measurement. When the condition of equation (7) is satisfied, the analyzed event and its distance retrieved from OTDR trace or measurement can be assigned to a given fibre drop link. This is because it is known which OTM initiated an alarm or reported a sudden change in received optical power. If the condition is not satisfied, the OTDR measurement should be repeated with better accuracy.

Figure 10:
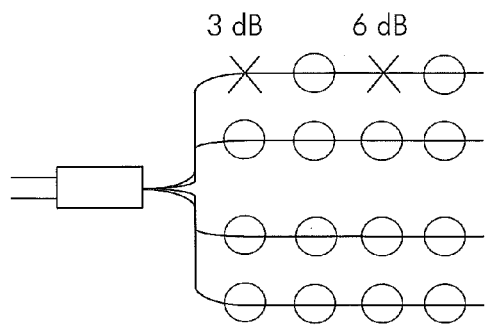
FIG. 10 is an illustration of an event/fault scenario in which two events/faults occur in one fibre drop link.

FIG. 10 illustrates another scenario in which multiple events, in this example two events, occur in the same drop link fibre. The probability for this scenario to occur is relatively low with regards to the different scenarios that may occur as illustrated in FIGS. 9-12.

In FIG. 10, two events occur in the same fibre drop link. The following description regarding FIG. 10 will be more general, i.e. not limited to two faults. In order to generalize the scenario illustrated in FIG. 10, assume that the total power difference in the fibre drop link experiencing the power difference is caused by J number of events as recorded by the OTDR measurement. The total power difference can then be expressed by the following equation:

$$\Delta TL = \left|5*\log\left(\frac{N - 1 + \prod_{j=1}^{J} \alpha_{NEWj}^2}{N}\right)\right|. \quad (8)$$

From this, the actual magnitude, $\alpha_{NEWj}$, of each fault giving rise to the event can then be calculated using:

$$\alpha_{NEWj}[dB] = 5*log\left(1 - N + N*10^{\frac{-|\Delta TLj|}{5}}\right). \quad (9)$$

$\Delta$TLj is the loss from the beginning of the OTDR trace or measurement to the place where an analyzed event is detected with all the events on the way to the analyzed event and including the analyzed event. The sum of all the $\alpha_{NEWj}$ [dB] events should correspond to a power difference detected by or experienced by an ONT which is connected to fibre drop link subjected to the events. Such a difference is further given as follows:

$$\Delta OTM = \sum_{j=1}^{J} \alpha_{NEWj}[dB] \pm \delta_{OTM} \quad (10)$$

$$\Delta OTM = \sum_{j=1}^{j} 5*\log\left(1 - N + N*10^{\frac{-|\Delta TLj|}{5}}\right) \pm \delta_{OTM}. \quad (11)$$

When the equation or condition (11) above is satisfied, the analyzed events and its distances retrieved from OTDR trace can be assigned to a given fibre drop link. Otherwise, the OTDR measurement should be repeated with better accuracy. Again, it is known which OLT has initiated an alarm or reported a difference in received optical power, thereby it is known which fibre drop link is subjected to the events. Thereby, it is known which fibre drop link is subjected to the event.

Figure 11:
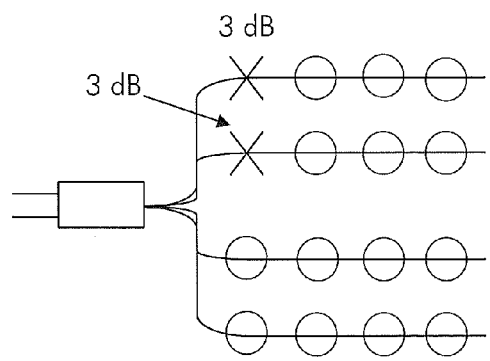
FIG. 11 is an illustration of an event/fault scenario in which one event/fault occurs at the same location in two fibre drop links.

FIG. 11 illustrates a scenario in which an event occurs in two different fibre drop links and at the same location at the two fibre drop links. The probability of this scenario to occur is relatively high in relation to the other scenarios illustrated in FIGS. 9-12. The OTDR trace or measurement will detect a single event overlapping in the two fibre drop links. The scenario illustrated in FIG. 11 can be generalized so that the OTDR trace or measurement will detect a single event overlapping in the multiple fibre drop links. In this scenario, the total power difference caused by the single event overlapping in multiple fibre drop links as detected by the OTDR measurement or trace can be defined as.

$$\Delta TL = \left|5*\log\left(\frac{\sum_{n=1}^{N} \alpha_{NEWn}^2}{N}\right)\right|. \quad (12)$$

By re-writing equation (12), the event in the first fibre drop link (n=1) is given as follows:

$$\alpha_{NEW\,1}[dB] = 5*\log\left(n*10^{\frac{-|\Delta TL|}{5}} - \sum_{n=2}^{N} \alpha_{NEW\,n}^2\right). \quad (13)$$

From the above, it can be seen that each $\alpha_{NEW}$ [dB] is a function of all remaining events. Thus it is not possible to calculate each event separately. However, from a practical point of view it is very unlikely that several overlapping events have much different magnitudes, e.g. telecom cable cut will affect all fibers more or less equally. Under this assumption, the magnitudes of the faults can be written as:

$$\alpha_{NEW\,1} = \alpha_{NEW2} = \ldots = \alpha_{NEW\,N} = \alpha_{NEW}. \text{ Then,}$$

$$\sum_{n=1}^{N} \alpha_{NEW\,n}^2 = N*\alpha_{NEW}^2.$$

As a result, equation (13) is reduced to:

$$10*\log \alpha_{NEW} = -|\Delta TL| \text{ and}$$

$$\alpha_{NEW\,1}[dB] = \alpha_{NEW2}[dB] = \ldots = \alpha_{NEW\,N}[dB] = -|\Delta TL|.$$

A straightforward conclusion is that in case of overlapping events, assuming they show the equal or near-equal magnitudes, the OTDR step magnitude represents the real event magnitude reported by OTM. The OTDR step magnitude corresponds to the event magnitude x of FIG. 1, i.e. the magnitude as "seen" by the OTDR device in the backscattered signal.

$$\Delta OTM_n = -|\Delta TL| \pm \delta_{OTM}. \quad (14)$$

When the equation or condition (14) is satisfied, the analyzed events and their distances retrieved from OTDR trace can be assigned to a given fibre drop link. Otherwise, the OTDR measurement should be repeated with better accuracy. Again the fibre drop link is given by which ONT has initiated an alarm or reported a difference in received optical power. Thereby, it is known which fibre drop link is subjected to the event.

Figure 12:
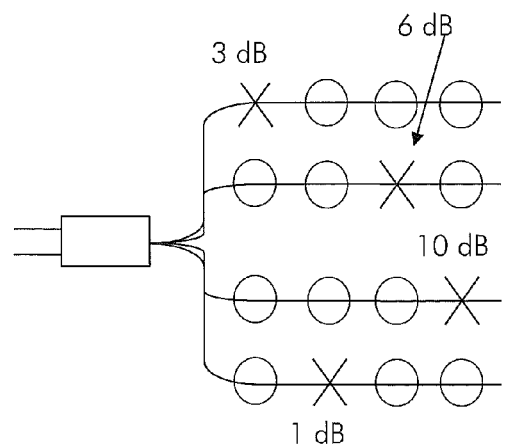
FIG. 12 is an illustration of an event/fault scenario in which one event occurs in several fibre drop links at different locations in the different fibre drop links.
Figure 13:
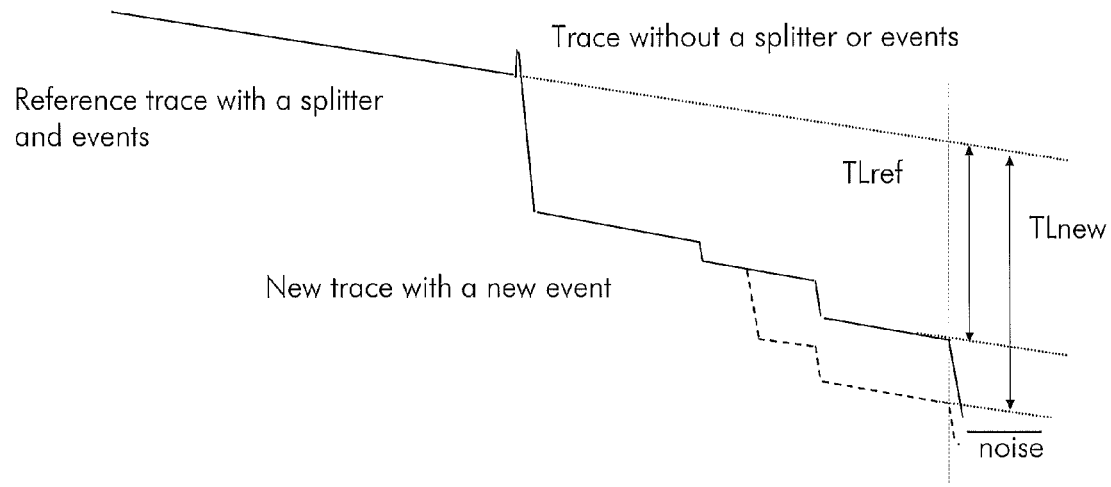
FIG. 13 illustrates an exemplifying OTDR trace reference and a new OTDR trace.

FIG. 12 is an illustration of an event/fault scenario in which one event occurs in several fibre drop links at different locations in the different fibre drop links.

In this scenario, it is assumed that the difference in magnitudes between the events is above the accuracy of the OTDR measurement (usually 5%) and OTM repeatability (usually 0.5 dB). A set of J equations, where J (J≤N) is the number of detected events (and/or changes in existing events), is constructed as follows:

$$\sum_{j=1}^{J^1} \alpha_{NEWj}^2 = N * 10^{-\frac{\left|\sum_{j=1}^{J^1} \Delta TL_j\right|}{5}} - (N - J^1), J^1 = 1, 2, \ldots, J. \quad (15)$$

$$\Delta OTM_j = \alpha_{NEWj} [dB] \pm \delta_{OTM}.$$

When equation or condition (15) is satisfied, the analyzed events and its distances retrieved from OTDR trace can be assigned to a given fibre drop link. Otherwise, the OTDR measurement should be repeated with better accuracy.

With reference to FIG. 9 and the scenario in which a single event occurs in one location in one fibre drop link, events of 1 dB can be detected in fibre drop links, which result in around 0.1 dB step on the OTDR measurement after a 2:8 splitter, i.e. the last splitter stage in a multistage splitter. For other sizes of sub-splitters the minimum detectable event is depicted in FIG. 14.

Figure 14:
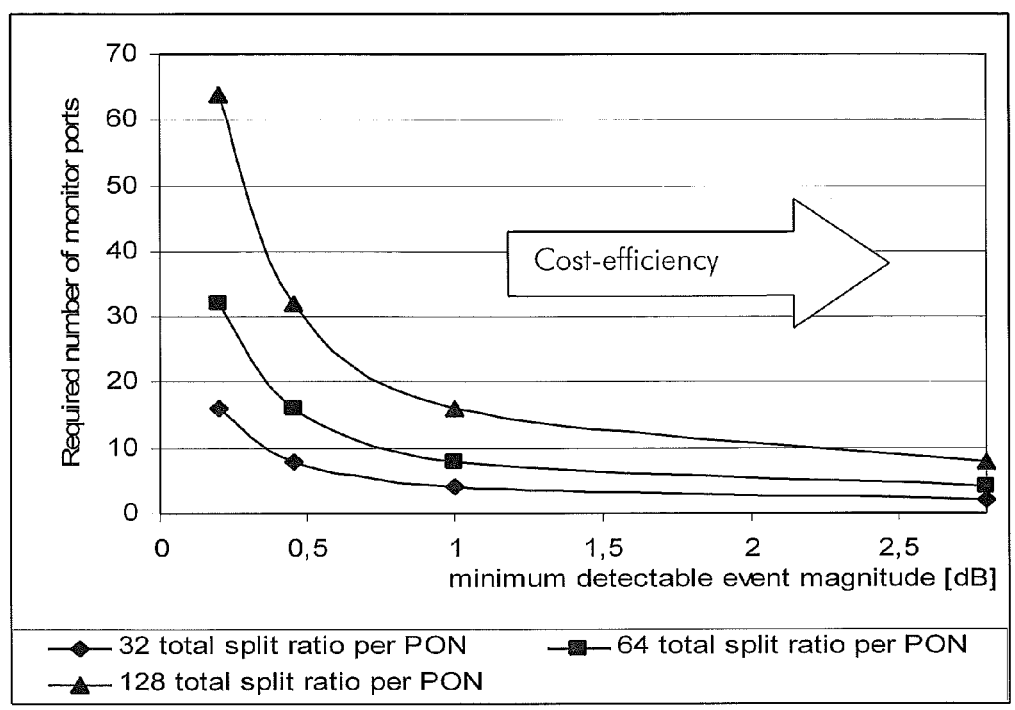
FIG. 14 illustrates the required number of monitor ports as a function of minimum detectable event magnitudes for different total split ratios per PON.

FIG. 14 illustrates the required number of monitor ports as a function of minimum detectable event magnitudes for different total split ratios per PON. The required number of monitor ports is based on equation (4) above.

The required number of monitor ports as a function of minimum detectable event magnitudes is a trade-off between the sensitivity of the fault-detection system and its cost-efficiency. The higher the fault-detection threshold, the higher the number of fibre drop ports supported by a single monitor port.

While the invention has been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the present invention and defined by the pending claims.

The invention claimed is:

1. A method of performing fault analysis in a Passive Optical Network, PON, by using Optical Time Domain Reflectometry, OTDR, comprising:

triggering a new OTDR measurement, wherein a previous reference measurement has been made indicating an original state of said PON;

inserting an OTDR measurement signal into a multistage splitter before a last splitter stage of said multistage splitter, and wherein the last splitter stage is of ratio 2:N;

obtaining at least one new event location based on the OTDR measurement signal; and calculating a fault magnitude at a given location by subtracting an event magnitude obtained from the new OTDR measurement from said reference OTDR measurement and taking into account a number of drop links connected to the last splitter stage in the reference measurement and the new measurement, thereby enabling determination of position and severity of fault locations, wherein a total loss, TLref, in said reference OTDR measurement is represented by $$TLref = 5 * \log\left(\frac{N^2}{\sum_{n=1}^{N}\prod_{j=1}^{J} \alpha REF_{n,j}^2 - M_{REF}}\right),$$

where N is the number of branches of the last splitter stage of said multistage splitter, J is the number of events and M is the number of non-connected branches of said last splitter stage of said multistage splitter.

2. A method according to claim 1, wherein the new OTDR measurement is triggered by a fault alarm or an Optical Transceiver Monitoring, OTM, measurement report received from at least one Optical Network Terminal, ONT, connected to said PON.

3. A method according to claim 1, further comprising querying one or more ONTs connected to said PON about their received optical power periodically.

4. A method according to claim 1, further comprising querying one or more ONTs connected to said PON about their received optical power on-demand.

5. A method according to claim 1, wherein a total loss, TLnew, in said new OTDR measurement is represented by $$TLnew = 5 * \log\left(\frac{N^2}{\sum_{n=1}^{N}\prod_{j=1}^{J} \alpha NEW_{n,j}^2 - M_{NEW}}\right),$$

where N is the number of branches of the last splitter stage of said multistage splitter, J is the number of events and M is the number of non-connected branches of said last splitter stage of said multistage splitter.

6. A computer program comprising computer readable instructions embodied in a non-transitory storage medium, which when run in one or more processing units, is operable to perform the method according to claim 1.

7. A computer program product, comprising the computer program according to claim 6.

8. A method according to claim 5, wherein a difference, ΔTL, between said total loss in said reference OTDR measurement and said total loss in said new OTDR measurement is represented by $$\Delta TL = \left|5 * \log\left(\frac{\sum_{n=1}^{N}\prod_{j=1}^{J} \alpha NEW_{n,j}^2 - M_{NEW}}{\sum_{n=1}^{N}\prod_{j=1}^{J} \alpha REF_{n,j}^2 - M_{REF}}\right)\right|.$$

9. A method of performing fault analysis in a Passive Optical Network, PON, by using Optical Time Domain Reflectometry, OTDR, comprising:

triggering a new OTDR measurement, wherein a previous reference measurement has been made indicating an original state of said PON;

inserting an OTDR measurement signal into a multistage splitter before a last splitter stage of said multistage splitter, and wherein the last splitter stage is of ratio 2:N;

obtaining at least one new event location based on the OTDR measurement signal; and calculating a fault magnitude at a given location by subtracting an event magnitude obtained from the new OTDR measurement from said reference OTDR measurement and taking into account a number of drop links connected to the last splitter stage in the reference measurement and the new measurement, thereby enabling determination of position and severity of fault locations, wherein an alarm is received from one ONT, the at least one new event location is one new event location, and no events were detected in the reference measurement, wherein all of a plurality of branches were connected to said multistage splitter in said OTDR reference measurement and are connected in the new OTDR measurement, further comprising calculating the magnitude of the fault, α, using $$\alpha[dB] = 5*\log\left(1 - N + N*10^{\frac{-|\Delta TL|}{5}}\right).$$

10. A method of performing fault analysis in a Passive Optical Network, PON, by using Optical Time Domain Reflectometry, OTDR, comprising:

triggering a new OTDR measurement, wherein a previous reference measurement has been made indicating an original state of said PON;

inserting an OTDR measurement signal into a multistage splitter before a last splitter stage of said multistage splitter, and wherein the last splitter stage is of ratio 2:N;

obtaining at least one new event location based on the OTDR measurement signal; and calculating a fault magnitude at a given location by subtracting an event magnitude obtained from the new OTDR measurement from said reference OTDR measurement and taking into account a number of drop links connected to the last splitter stage in the reference measurement and the new measurement, thereby enabling determination of position and severity of fault locations, wherein an alarm is received from one ONT and the at least one new event location is j new event locations, j>1, and no events were detected in the reference measurement, further comprising calculating the magnitude of the fault in a first ONT, α, using, $$\alpha_j[dB] = 5*\log(1 - N + N*10^{-|\Delta TL_j|}).$$

11. A method of performing fault analysis in a Passive Optical Network, PON, by using Optical Time Domain Reflectometry, OTDR, comprising:

triggering a new OTDR measurement, wherein a previous reference measurement has been made indicating an original state of said PON;

inserting an OTDR measurement signal into a multistage splitter before a last splitter stage of said multistage splitter, and wherein the last splitter stage is of ratio 2:N;

obtaining at least one new event location based on the OTDR measurement signal; and calculating a fault magnitude at a given location by subtracting an event magnitude obtained from the new OTDR measurement from said reference OTDR measurement and taking into account a number of drop links connected to the last splitter stage in the reference measurement and the new measurement, thereby enabling determination of position and severity of fault locations, wherein an alarm is received from n number of ONTs, n>1, and the at least one new event location is one new event location and no events were detected in the reference measurement, further comprising calculating the magnitude of the fault in a first ONT, α, using $$\alpha[dB] = 5*\log\left(N*10^{\frac{-|\Delta TL|}{5}} - \sum_{m=2}^{N}\alpha_n^2\right).$$

12. A client unit in a fibre plant manager adapted to perform fault analysis in a Passive Optical Network, PON, by using Optical Time Domain Reflectometry, OTDR, comprising:

an interface unit; and a processing unit, wherein the processing unit is configured to:

trigger a new OTDR measurement, wherein a previous reference measurement has been made indicating an original state of said PON;

insert an OTDR measurement signal into a multistage splitter before a last splitter stage of said multistage splitter, and wherein the last splitter stage is of ratio 2:N, via said interface unit;

obtain at least one new event location based on the OTDR measurement signal, via said interface unit; and calculate a fault magnitude at a given location by subtracting an event magnitude obtained from the new OTDR measurement from said reference OTDR measurement and taking into account a number of drop links connected to the last splitter stage in the reference measurement and the new measurement, thereby enabling determination of position and severity of fault locations, wherein the client unit, the interface unit, and the processing unit are embodied in at least one non-transitory storage medium, hardware, and/or circuitry, and wherein said processing unit is adapted to represent a total loss, TLref, in said reference OTDR measurement by $$TLref = 5*\log\left(\frac{N^2}{\sum_{n=1}^{N}\prod_{j=1}^{J}\alpha REF_{n,j}^2 - M_{REF}}\right),$$

where N is the number of branches of the last splitter stage of said multistage splitter, J is the number of events and M is the number of non-connected branches of said last splitter stage of said multistage splitter.

13. A client unit according to claim 12, wherein said interface unit is further adapted to receive a fault alarm or an Optical Transceiver Monitoring, OTM, measurement report from at least one Optical Network Terminal, ONT, connected to said PON, wherein said processing unit is triggered to insert said OTDR measurement signal into said multistage splitter before said last splitter stage of said multistage splitter.

14. A client unit according to claim 12, wherein said processing unit is further adapted to periodically query one or more ONTs connected to said PON about their received optical power.

15. A client unit according to claim 12, wherein said processing unit is further adapted to query one or more ONTs connected to said PON about their received optical power on-demand.

16. A client unit according to claim 12, wherein said processing unit is adapted to represent a total loss, TLnew, in said new OTDR measurement by $$TLnew = 5*\log\left(\frac{N^2}{\sum_{n=1}^{N}\prod_{j=1}^{J}\alpha NEW_{n,j}^2 - M_{NEW}}\right),$$

where N is the number of branches of the last splitter stage of said multistage splitter, J is the number of events and M is the number of non-connected branches of said last splitter stage of said multistage splitter.

17. A client unit according to claim 16, wherein said processing unit is adapted to represent a difference, $\Delta TL$, between said total loss in said reference OTDR measurement and said total loss in said new OTDR measurement, $\Delta TL$, by $$\Delta TL = \left|5*\log\left(\frac{\sum_{n=1}^{N}\prod_{j=1}^{J}\alpha NEW_{n,j}^2 - M_{NEW}}{\sum_{n=1}^{N}\prod_{j=1}^{J}\alpha REF_{n,j}^2 - M_{REF}}\right)\right|.$$

18. A client unit in a fibre plant manager adapted to perform fault analysis in a Passive Optical Network, PON, by using Optical Time Domain Reflectometry, OTDR, comprising:
an interface unit; and
a processing unit, wherein the processing unit is configured to:
trigger a new OTDR measurement, wherein a previous reference measurement has been made indicating an original state of said PON;
insert an OTDR measurement signal into a multistage splitter before a last splitter stage of said multistage splitter, and wherein the last splitter stage is of ratio 2:N, via said interface unit;
obtain at least one new event location based on the OTDR measurement signal, via said interface unit; and
calculate a fault magnitude at a given location by subtracting an event magnitude obtained from the new OTDR measurement from said reference OTDR measurement and taking into account a number of drop links connected to the last splitter stage in the reference measurement and the new measurement,
thereby enabling determination of position and severity of fault locations,
wherein the client unit, the interface unit, and the processing unit are embodied in at least one non-transitory storage medium, hardware, and/or circuitry, and
wherein an alarm is received from one ONT, the at least one new event location is one new event location, and no events were detected in the reference measurement, wherein all of a plurality of branches were connected to said multistage splitter in said OTDR reference measurement and are connected in the new OTDR measurement, wherein said processing unit is adapted to calculate the magnitude of the fault, $\alpha$, using $$\alpha[dB] = 5*\log\left(1 - N + N*10^{\frac{-|\Delta TL|}{5}}\right).$$

19. A client unit in a fibre plant manager adapted to perform fault analysis in a Passive Optical Network, PON, by using Optical Time Domain Reflectometry, OTDR, comprising:
an interface unit; and
a processing unit, wherein the processing unit is configured to:
trigger a new OTDR measurement, wherein a previous reference measurement has been made indicating an original state of said PON;
insert an OTDR measurement signal into a multistage splitter before a last splitter stage of said multistage splitter, and wherein the last splitter stage is of ratio 2:N, via said interface unit;
obtain at least one new event location based on the OTDR measurement signal, via said interface unit; and
calculate a fault magnitude at a given location by subtracting an event magnitude obtained from the new OTDR measurement from said reference OTDR measurement and taking into account a number of drop links connected to the last splitter stage in the reference measurement and the new measurement,
thereby enabling determination of position and severity of fault locations,
wherein the client unit, the interface unit, and the processing unit are embodied in at least one non-transitory storage medium, hardware, and/or circuitry, and
wherein an alarm is received from one ONT and the at least one new event location is j new event locations, j>1, and no events were detected in the reference measurement, wherein said processing unit is adapted to calculate the magnitude of the fault in a first ONT, $\alpha$, using $$\alpha_j[dB] = 5*\log(1 - N + N*10^{-|\Delta TL_j|}).$$

20. A client unit in a fibre plant manager adapted to perform fault analysis in a Passive Optical Network, PON, by using Optical Time Domain Reflectometry, OTDR, comprising:
an interface unit; and
a processing unit, wherein the processing unit is configured to:
trigger a new OTDR measurement, wherein a previous reference measurement has been made indicating an original state of said PON;
insert an OTDR measurement signal into a multistage splitter before a last splitter stage of said multistage splitter, and wherein the last splitter stage is of ratio 2:N, via said interface unit;
obtain at least one new event location based on the OTDR measurement signal, via said interface unit; and
calculate a fault magnitude at a given location by subtracting an event magnitude obtained from the new OTDR measurement from said reference OTDR measurement and taking into account a number of drop links connected to the last splitter stage in the reference measurement and the new measurement,
thereby enabling determination of position and severity of fault locations,
wherein the client unit, the interface unit, and the processing unit are embodied in at least one non-transitory storage medium, hardware, and/or circuitry, and wherein an alarm is received from n number of ONTs, n>1, and the at least one new event location is one new event location and no events were detected in the reference measurement, wherein said processing unit is adapted to calculate the magnitude of the fault in a first ONT, α, using $$\alpha[dB] = 5*\log\left(N*10^{\frac{-|\Delta TL|}{5}} - \sum_{m=2}^{N}\alpha_n^2\right).$$

* * * * *